(12) United States Patent
Sormani et al.

(10) Patent No.: US 8,030,408 B2
(45) Date of Patent: Oct. 4, 2011

(54) TRICURE ACRYLIC RESINS

(75) Inventors: Patricia Mary Ellen Sormani, Newark, DE (US); James William O'Neil, Chadds Ford, PA (US)

(73) Assignee: E. I. du Pont de Nemours and Company, Wilimington, DE (US)

(*) Notice: Subject to any disclaimer, the term of this patent is extended or adjusted under 35 U.S.C. 154(b) by 477 days.

(21) Appl. No.: 12/202,211

(22) Filed: Aug. 29, 2008

(65) Prior Publication Data

US 2010/0056729 A1 Mar. 4, 2010

(51) Int. Cl.
*C08F 220/20* (2006.01)
*C08F 220/34* (2006.01)

(52) U.S. Cl. ...... 525/226; 525/227; 525/218; 427/385.5

(58) Field of Classification Search ............... 525/218, 525/226, 227; 427/385.5
See application file for complete search history.

(56) References Cited

U.S. PATENT DOCUMENTS

| | | | |
|---|---|---|---|
| 4,659,799 A | 4/1987 | Nahas et al. | |
| 4,755,565 A * | 7/1988 | Snow ........................ | 525/379 |
| 5,283,290 A | 2/1994 | Jung et al. | |
| 5,391,631 A | 2/1995 | Porsch et al. | |
| 5,516,820 A | 5/1996 | Babjak et al. | |
| 5,859,136 A * | 1/1999 | Scopazzi et al. ............. | 525/123 |
| 6,013,739 A * | 1/2000 | Rink et al. .................... | 525/451 |
| 6,174,953 B1 | 1/2001 | Huybrechts | |
| 6,239,214 B1 | 5/2001 | Huybrechts et al. | |
| 6,326,059 B1 * | 12/2001 | Lewin et al. ................ | 427/379 |
| 6,471,185 B2 | 10/2002 | Lewin et al. | |
| 6,541,571 B1 | 4/2003 | Haldankar | |
| 6,632,880 B2 | 10/2003 | Barsotti et al. | |
| 6,984,693 B2 | 1/2006 | Lewin et al. | |
| 2005/0003094 A1 | 1/2005 | Grady et al. | |
| 2006/0100305 A1 | 5/2006 | Ma | |
| 2006/0100353 A1 | 5/2006 | Barsotti et al. | |
| 2007/0009740 A1 | 1/2007 | Burgman et al. | |
| 2010/0055480 A1 * | 3/2010 | Sormani et al. ............ | 428/458 |

FOREIGN PATENT DOCUMENTS

| | | |
|---|---|---|
| EP | 996652 B1 | 11/2002 |
| JP | 90003828 B | 1/1990 |
| WO | 0185813 A2 | 11/2001 |

* cited by examiner

*Primary Examiner* — Satya Sastri
(74) *Attorney, Agent, or Firm* — Brian J Myers

(57) ABSTRACT

The present invention is a coating composition comprising a tricure acrylic resin which comprises functionality having different rates of reactivity to crosslinking compounds such as, for example, diisocyantes and polyisocyanates.

13 Claims, No Drawings

TRICURE ACRYLIC RESINS

FIELD OF THE INVENTION

This invention is related to coating compositions. More particularly, this invention is related to acrylic coating composition.

BACKGROUND OF THE INVENTION

Solvent-based refinish coating compositions are known, and generally include a crosslinkable component and a crosslinking component. The crosslinking component causes the crosslinkable component to form crosslinks when the two are mixed. The crosslinkable component and the crosslinking component are kept separated in packs and then mixed just prior to being applied. This coating process shall be referred to herein as a "two-pack" coating composition process. The two pack coating process is known to produce coatings of very good quality.

One problem associated with such coating compositions is the relatively long time required to cure these compositions. Long cure times for automotive coatings can reduce productivity in automotive refinish shops by requiring the automobile to remain in the area in which it was spray coated for a longer period of time. Long cure times are also undesirable because they create longer waiting periods before a coating that can be readily sanded or buffed without fouling sandpaper. Longer cure times also prevent the practitioner from quickly removing coated automobile or truck bodies out of the spray booths to fully cure at other convenient locations. As a result, productivity of coating autobodies is decreased.

Attempts have been made to decrease the curing time of these two pack-coating compositions by using more reactive components or catalysts. However, while the use of such components decreases curing time, the higher reactivity of such components usually reduces the time to gelation, that is, reduces the pot life of the coating composition as well. In an extreme case, instant gelation of the composition can occur when the crosslinkable component, for example a polyisocyanate, is mixed with compounds or polymers having reactive amine groups. Thus, a need still exists for a two-pack coating composition that cures rapidly while still having a pot life that is acceptable to the automotive coatings industry.

U.S. Pat. Nos. 6,362,059 and 6,471,185—both to DuPont—disclose a dual cure resin system, wherein the functionality is provided by separate components, comprising in the range of from 0.5 to 8.0 weight percent, based on the weight of the binder component solids of secondary amine moieties and also comprising in the range of from 5.0 to 70 weight percent, based on the weight of the binder component solids of hydroxyl moieties. The resin system cures rapidly in a first stage to produce a coating surface that can be readily buffed or sanded and, thereafter, a second stage cure takes place over a period of days to produce a coating having more durable properties.

SUMMARY OF THE INVENTION

In one aspect, the present invention is a coating composition comprising a crosslinkable component and a crosslinking component wherein said crosslinkable component comprises a polymer that is the reaction product obtained by polymerizing a monomeric composition comprising;

a) in the range of from 5 to 50 percent by weight, based on the total weight of said polymer, of at least one monomer having a primary hydroxyl group, b) in the range of from 2 to 30 percent by weight, based on the total weight of said polymer, of at least one monomer having a secondary hydroxyl group, and c) in the range of from 0.1 to less than 0.5 percent by weight, based on the total weight of said polymer, of at least one monomer having a secondary amine group wherein said polymer has a Tg in the range of from −20 to 100° C., a weight average molecular weight in the range of from 1,000 to 40,000.

DETAILED DESCRIPTION OF THE INVENTION

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise, if such use is not repugnant to one of ordinary skill in the art.

The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within the ranges. Also, the disclosure of these ranges is intended as a continuous range including every value between the minimum and maximum values.

As used herein, the term "Crosslinkable component" means a component used to provide a coating composition wherein the crosslinkable component is inclusive of a compound, polymer, copolymer or a polydisperse mixture of compounds, polymers and/or copolymers all having nucleophillic or active-hydrogen-containing functional groups that are capable of reacting with functional groups on the crosslinking component during the curing step to produce a coating in the form of crosslinked structures.

As used herein, the term "Crosslinking component" shall mean a component used to provide a coating composition wherein the crosslinking component is inclusive of a compound, polymer, copolymer or a polydisperse mixture of compounds, polymers, and/or copolymers all having functional groups that are capable reacting with the functional groups on the crosslinkable component during the curing step to produce a coating in the form of crosslinked structures. Crosslinking reactions are known and understood by those of ordinary skill in the art.

"Two-pack coating composition" as the term is used herein refers to a coating composition obtained by mixing two components that are stored in separate containers prior to mixing them together. The storage containers are typically sealed to increase the shelf life of the components of the coating composition.

The components are mixed prior to coating a substrate surface to form a pot mix. The pot mix has a limited pot life that typically can be in the range of from about one hour or less (that is, from about 30 minutes to about 60 minutes) to one hour or more (that is, from about 1 to 2 hours). The pot mix is applied to a substrate, typically through a spray nozzle, as a layer of some predetermined desirable thickness. After application, the layer is cured under ambient conditions or bake cured at elevated temperatures to form a coating on the substrate having desired coating properties, such as, for example, high gloss, mar-resistance and resistance to environmental etching.

"GPC weight average molecular weight" and "GPC number average molecular weight" means a weight average molecular weight (Mw) and a number average molecular weight (Mn), respectively measured by utilizing gel permeation chromatography (GPC). A high performance liquid chromatograph (HPLC) supplied by Hewlett-Packard; Palo Alto, Calif. was used. Unless stated otherwise, tetrahydrofuran was used as the liquid phase and polystyrene was used as the standard.

All patents, patent applications and publications referred to herein are incorporated by reference in their entirety.

In one embodiment, the present invention is a coating composition useful for coating surfaces such as automobile surfaces. A coating composition of the present invention comprises a crosslinkable component and a crosslinking component.

In a particular embodiment, the crosslinkable component comprises a polymer having "tricure" functionality. That is, the polymer is produced from at least three different monomers having functional groups with different rates of reactivity towards the crosslinking component. Preferably the functional groups are selected from secondary amine, primary hydroxyl and secondary hydroxyl groups. Preferably, the polymer is an acrylic polymer that can be linear, branched, or have a core-shell structure. A crosslinkable component of the present invention typically comprises a polymer having a smaller percentage of amine functional moieties relative to crosslinkable components described in the prior art. A crosslinkable polymer of the present invention uses a combination of both fast cure and slow cure hydroxyl functional groups. By "fast cure" and "slow cure" hydroxyl functional groups, it is meant that relative rates of reaction of the two different hydroxyl functional groups of the resin are different. For example, the reaction of a primary hydroxyl group with an isocyanate functional group generally proceeds faster than that of the reaction of a secondary hydroxyl functional group with an isocyanate. For the purposes of the present invention, the terms "fast cure" and "fast reacting" can be used interchangeably without changing the intent of the description provided. Also for the purposes of the present invention, the terms "slow cure" and "slow reacting" can be used interchangeably without changing the intent of the description provided. In the present invention, a relatively fast reacting primary hydroxyl group is copolymerized with a secondary hydroxyl group to obtain a crosslinkable polymer having mixed reactivity.

A crosslinkable polymer of the present invention comprises a reacted primary hydroxyl group-containing monomer in the range of from 5.0 to 50 percent by weight, based on the total weight of the polymer. Preferably, the polymer is obtained from a monomer mixture having a primary hydroxyl functional group content in the range of from 8.0 to 35 percent by weight of the polymer mixture and more preferably, in the range of from 10 to 25 percent by weight of the polymer mixture. For clarity, weight percents are based on the total weight of the polymer, if that differs from the weight of the polymer mixture.

The primary hydroxyl functional group-containing monomer can be any primary hydroxyl-containing acrylate or methacrylate monomer known or used conventionally by one of ordinary skill in the art in coating compositions. The primary hydroxyl-containing monomer is preferably selected from the group consisting of: ω-hydroxyalkyl acrylates; and ω-hydroxyalkyl methacrylates, wherein the alkyl ester portion contains 2 to 6 carbon atoms; or mixtures thereof. In particular, the primary hydroxyl-containing monomer can be selected from 4-hydroxybutyl acrylate and 4-hydroxybutyl methacrylate.

The polymer further comprises in the range of from 2.0 to 30 percent by weight, based on the total weight of the polymer, of a monomer having a secondary hydroxyl group. Preferably, monomers having a secondary hydroxyl functional group are present in the range of from 3.0 to 25 percent by weight and more preferably, are present in the range of from 4.0 to 15 percent by weight, all weight percents are based upon the total weight of the polymer.

The secondary hydroxyl functional group-containing monomer can be any secondary hydroxyl-containing monomer that also comprises polymerizable acrylate functionality can be suitable for use in the practice of the present invention. For example, acrylate or methacrylate compounds obtained by reaction with 1,2 epoxy compound having 3 or more carbon atoms can be suitable for use herein. Other secondary hydroxyl group-containing monomers are known or can be envisaged by those skilled in the art without departing from the intended scope of the present invention. For example, 2-hydroxypropyl acrylate or 2-hydroxypropyl methacrylate can be suitable for use herein.

The crosslinkable component further comprises amine functionality. The crosslinkable component comprises in the range of from 0.1 to 0.5 percent by weight, based on the weight of the total monomer charge, of a monomer having an amine functional group. Preferably, the amine-containing monomer is present in the range of from 0.20 to 0.45 percent by weight and more preferably, the amine-containing monomer is present in the range of from 0.25 to 0.40 percent by weight, all percent by weights are based upon the weight of the total monomer charge.

The amine-containing monomer is selected from secondary amine compounds that include polymerizable acrylate or methacrylate functionality. For example, t-butylamino ethyl acrylate or t-butylamino ethyl methacrylate can be suitable for use in the practice of the present invention.

In one embodiment, the secondary amine functionality can be introduced by post reacting a polymer that comprises epoxy functionality, such as polymers obtained from glycidyl (meth)acrylate for example, with a primary amine or with an alkanol amine having primary amine groups. Primary amines suitable for such use include propyl amine, butyl amine, hexyl amine, octyl amine and benzyl amine. Suitable alkanol amines include ethanolamine, propanol amine, butanol amine and methyl ethanolamine. For clarity, it should be noted that if the secondary amine functionality is introduced via post reaction of an epoxy group with an alkanol amine, the resulting hydroxyl groups are not considered in the calculation of the percent by weight of primary or secondary hydroxyl group in the polymer.

The crosslinkable polymer can optionally comprise other monomeric units such as, for example: styrene; alkyl styrene; vinyl toluene; and alkyl acrylates or alkyl methacrylates having alkyl groups of from 1-18 carbon atoms. Suitable alkyl acrylates and alkyl methacrylates include, for example: methyl acrylate; methyl methacrylate; ethyl acrylate; ethyl methacrylate; isopropyl acrylate; isopropyl methacrylate; n-butyl acrylate; n-butyl methacrylate; isobutyl acrylate; isobutyl methacrylate; pentyl acrylate; pentyl methacrylate; hexyl acrylate; hexyl methacrylate; 2-ethyl hexyl acrylate; 2-ethyl hexyl methacrylate; nonyl acrylate; nonyl methacrylate; lauryl acrylate; lauryl methacrylate; stearyl acrylate; and stearyl methacrylate. Suitable acrylates and methacrylates can also include cycloaliphatic acrylate and cycloaliphatic methacrylates such as, for example: cyclohexyl acrylate; cyclohexyl methacrylate; isobornyl acrylate; isobornyl methacrylate; trimethylcyclohexyl acrylate; trimethylcyclohexyl methacrylate; glycidyl acrylate; glycidyl methacrylate; benzyl acrylate; and benzyl methacrylate. Combinations of any of the above can also be suitable.

The crosslinkable component comprises an acrylic polymer that can be linear, branched or the crosslinkable component can have a combination of both linear and branched polymers. The linear acrylic polymer is preferred.

Linear and branched acrylic polymers preferably have a weight average molecular weight (Mw) varying in the range of from 1,000 to 40,000, preferably varying in the range of from 1,500 to 30,000, more preferably varying in the range of from 2000 to 25,000. Suitable acrylic polymers have a Tg varying in the range of from of −20° C. to 100° C., preferably varying in the range of from 0° C. to 90° C., and more preferably varying in the range of from 40° C. to 80° C.

Polymers and copolymers of the present invention can be obtained by conventional processes well known to those of ordinary skill in the art. Typically, solvent is added into a reactor and brought to reflux temperature under a nitrogen blanket. Upon attaining the desired polymerization temperature, an initiator and the monomer mixture are fed to the reactor over a period of time. The monomer mixture and initiator can be added into the reactor all at once or fed in portions into the reactor.

In one embodiment, it can be optional to add the amine-containing monomer component last, or after a period wherein the other monomeric components have been partially or substantially polymerized. The crosslinkable component can be obtained by a process comprising the step of copolymerization of (1) a fast reacting hydroxyl group-containing monomer with (2) a slow reacting hydroxyl functional group-containing monomer prior to copolymerization of the amine-containing component.

Alternatively, before heating the reactor contents, a portion of the monomer mixture and the initiator can be added into the reactor.

Conventional initiators known to those of ordinary skill in the art can be suitable for use in the practice of the present invention alone or in combination with other initiators. Such conventional initiators include, without limitation: azo initiators such as, for example, 2,2'-azobis(2,4dimethylpentane nitrile); peroxides such as for example, di-tertiarybutyl peroxide; and hydroperoxides. Commercially available peroxy type initiator t-butylperacetate or TRIGANOX® B from Akzo Nobel is suitable for use in the present invention.

A branched acrylic polymer can be produced by a polymerization process that is described in both U.S. Pat. Nos. 4,680,352 and 5,290,633, which are incorporated herein by reference. In this process the branched polymers are made in two stages. In the first stage, macromonomers, using conventional cobalt (II) or (III) chelate chain transfer agent, are produced to ensure that the macromonomer is provided with one terminal ethylenically unsaturated group that can be further polymerized. During the second stage, the monomer mixture described earlier is added to the reactor containing the macromonomers. The monomers polymerize with the ethylenically unsaturated group on the macromonomer to produce the branched acrylic polymer. In a branched acrylic polymer, the desired secondary amine, primary hydroxyl and secondary hydroxyl group monomers can be added to either the macromonomer or the backbone.

The polymer can also be a core-shell polymer. The core-shell polymer has a solvent insoluble core, and a solvent soluble shell that is chemically attached to the core. Preferably, the shell is in the form of macromonomer chains or arms attached to the core. The core-shell polymer is a polymer particle dispersed in an organic media, wherein the polymer particle is stabilized by what is known as steric stabilization. The average particle size of the core ranges from 0.1 to 1.0 microns, preferably from 0.15 to 0.6, more preferably from 0.15 to 0.6.

The core-shell polymer includes in the range of from about 10 percent to 90 percent, preferably in the range of from 50 percent to 80 percent all in weight percent based on the weight of the core-shell polymer, of a core formed from high molecular weight polymer having a weight average molecular weight of about 50,000 to 500,000, preferably in the range of from 50,000 to 200,000, more preferably in the range of from 50,000 to 150,000. The arms make up about 10 percent to 90 percent, preferably 20 percent to 50 percent, all in weight percent based on the weight of the core-shell polymer. The arms are formed from a relatively lower molecular weight polymer having weight average molecular weight in the range of from about 1,000 to 50,000, preferably in the range of from 2000 to 40,000, more preferably in the range of from 3000 to 30,000.

The core of the dispersed core-shell polymer is comprised of one or more polymerized acrylic monomers. Suitable monomers include, for example, styrene, alkyl acrylates, and alkyl methacrylates having alkyl carbon atoms in the range of from 1 to 18, preferably in the range of from 1 to 12; ethylenically unsaturated monocarboxylic acid, such as, for example, acrylic acid and methacrylic acid; silane-containing monomers, and epoxy containing monomers, such as glycidyl (meth)acrylate. The core can be crosslinked using optional monomers, for example, amine containing monomers, hydroxyalkyl acrylates, hydroxyalkyl methacrylates or acrylonitrile. Optionally, the core may be crosslinked through the use of diacrylates or dimethacrylates, such as, allyl methacrylate or through post reaction of hydroxyl moieties with polyfunctional isocyanates or carboxylic moieties with epoxy moieties.

The core or the macromonomer arms attached to the core are polymerized from monomers having secondary amine monomers, primary hydroxyl monomers, and secondary hydroxyl monomers as described earlier. In addition, the arms can also contain polymerized monomers, such as, for example, styrene and alkyl acrylates and alkyl methacrylates wherein the alkyl portion has 1 to 18 carbon atoms.

The process for making the core-shell polymer is described in U.S. Pat. No. 5,659,136, which is incorporated herein by reference.

The coating composition may also comprise, as the crosslinkable component, one or more polyester resins as known in the art. Suitable polyesters have at least one or more functionalities that are reactive with isocyanate, for example, hydroxyl groups. A suitable polyester resin has a weight average molecular weight (Mw) within the range of from 2000 to 20,000, preferably within the range of from 3000 to 10,000. A suitable polyester resin has a Tg within the range of from 20° C. to 100° C., preferably within in the range of from 0° C. to 90° C., and more preferably within the range of from 20° C. to 80° C.

Polyesters suitable for use in the present invention can be polyesters known conventionally or used commercially by those of ordinary skill in the coating art. Suitable polyesters can be polymerized from suitable polyacids, including cycloaliphatic polycarboxylic acids, and suitable polyols, which include polyhydric alcohols. Examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid and cyclobutanetetracarboxylic acid. The cycloaliphatic polycarboxylic acids can be used not only in their cis but also in their trans form or a mixture thereof. Examples of suitable polycarboxylic acids, which, if desired, can be used together with the cycloaliphatic polycarboxylic acids, are aromatic and aliphatic polycarboxylic acids, such as, for example, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid.

Suitable polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, tris(hydroxyethyl) isocyanate, polyethylene glycol and polypropylene glycol. If desired, monohydric alcohols, such as, for example, butanol, octanol, lauryl alcohol, ethoxylated or propoxylated phenols may also be included along with polyhydric alcohols. The details of polyester suitable for use in the present invention are further provided in the U.S. Pat. No. 5,326,820, which is incorporated herein by reference. One example of the commercially available polyester suitable for use is SCD®-1040 polyester, which is supplied by Etna Product Inc., Chagrin Falls, Ohio.

The crosslinkable component may also include various polyether polyols to improve the properties of the coating. Various polyether polyols may be used as is known to those of ordinary skill in the art. One preferred polyether polyol is polytrimethylene ether polyol. The polytrimethylene ether polyol has a number average molecular weight in the range of from 500 to 5,000 and is present in the crosslinkable component in the range of from 1 to about 25 percent of the crosslinkable component. The polytrimethylene ether polyol is preferably produced via the polymerization of 1,3-propane diol that has been produced from the fermentation of a renewable resource. One particularly preferred renewable resource is corn since it is readily available and has a high rate of conversion to 1,3-propanediol and can be genetically modified to improve yields to diol. Typical bio-conversion processes are shown in U.S. Pat. Nos. 5,686,276, 5,633,362 and 5,821,092. U.S. '276 teaches a bio-conversion process of a fermentable carbon source to 1,3-propanediol by a single microorganism. U.S. '362 and U.S. '092 show the bio-conversion of glycerol to 1,3-propanediol by recombinant bacteria harboring a foreign gene encoding a diol dehydratase. The aforementioned patents are incorporated herein by reference.

The coating composition of the present invention comprises a crosslinkable component and a crosslinking component. The crosslinking component of the coating composition of the present invention includes one or more crosslinking agents having at least two isocyanate groups, such as a polyisocyanate crosslinking agent. Any of the conventional aromatic, aliphatic, cycloaliphatic, isocyanates, trifunctional isocyanates and isocyanate functional adducts of a polyol and a diisocyanate can be used. Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane and 4,4'-diisocyanatodiphenyl ether.

Typical trifunctional isocyanates include triphenylmethane triisocyanate, 1,3,5-benzene triisocyanate and 2,4,6-toluene triisocyanate. Trimers of diisocyanates also can be used, such as the trimer of hexamethylene diisocyanate, which is supplied by Bayer Corporation, Pittsburgh, Pa., under the trademark DESMODUR® N-3390. Other suitable polyisocyanates from Bayer Corporation include DESMODUR® N-3300, and Z-4470BA polyisocyanates.

The relative amount of crosslinking agent used in the coating composition is adjusted to provide a molar equivalent ratio of NCO/(OH+NH) in the range of from 0.5/1 to 2/1, preferably in the range of from 0.75/1 to 1.5/1 and more preferably in the range of from 0.85/1 to 1.5/1.

The coating composition preferably includes one or more catalysts to enhance crosslinking of the components during curing. Generally, the coating composition includes in the range of from 0.005 percent to 2 percent, preferably in the range of from 0.01 to 1 percent and more preferably in the range of from 0.02 percent to 0.7 percent of the catalyst, the percentages being in weight percentages based on the total weight of the crosslinkable and crosslinking component solids. These catalysts are preferably added to the crosslinkable component. Typical catalysts include, for example: dibutyl tin dilaurate; dibutyl tin Diacetate; dibutyl tin dichloride; dibutyl tin dibromide; triphenyl boron; tetraisopropyl titanate; triethanolamine titanate chelate; dibutyl tin dioxide; dibutyl tin dioctoate; tin octoate; aluminum titanate; aluminum chelates; zirconium chelate; hydrocarbon phosphonium halides such as, ethyl triphenyl phosphonium iodide and other such phosphonium salts; zinc octoate; zinc napthanate; and other catalysts or mixtures thereof known to those skilled in the art.

The coating composition of the present invention is a solventborne coating composition. Some of the suitable solvents include aromatic hydrocarbons, such as petroleum naphtha or xylenes; esters, such as, butyl acetate, t-butyl acetate, isobutyl acetate or hexyl acetate; and glycol ether esters, such as propylene glycol monomethyl ether acetate. The amount of organic solvent added depends upon the desired solids level as well as the desired amount of VOC of the composition. If desired, the organic solvent may be added to both the crosslinking and crosslinkable components of the coating composition.

The amount of solvent added to the coating composition may be adjusted to provide the composition with a VOC (volatile organic content) in the range of from 0.12 kilograms (1.0 pounds per gallon) to 0.78 kilograms (6.5 pounds per gallon) of the solvent per liter of the coating composition.

The coating composition of the present invention may also contain conventional additives, such as pigments, stabilizers, and rheology control agents, flow agents, and toughening agents. Such additional additives will depend on the intended use of the coating composition. For example, any additives that would adversely affect the clarity of the cured coating will not be included when the composition is used as a clear coating. The foregoing additives may be added to either component or both, depending upon the intended use of the coating composition.

Typical pigments that can be used in the coating composition are filler pigments such as talc, china clay, barytes, carbonates, silicates, and color pigment such as metallic oxides such as titanium dioxide, zinc oxide and iron oxide and carbon black and organic colored pigments and dyes. Also useful as pigments that can be added to the composition include the following: metallic oxides, such as titanium dioxide, zinc oxide, iron oxides of various colors, carbon black; filler pigments, such as talc, china clay, barytes, carbonates, silicates; and a wide variety of organic colored pigments, such as quinacridones, copper phthalocyanines, perylenes, azo pigments, indanthrone blues, carbazoles, such as carbozole violet, isoindolinones, isoindolones, thioindigo reds, benzimidazolinones; metallic flake pigments, such as aluminum flakes, mica flakes, pearlescent flakes, or a combination thereof.

To improve weatherability of the coating, 0.1 to 5 weight percent, preferably 0.5 to 2.5 weight percent and more preferably 1 to 2 weight percent of ultraviolet light stabilizers screeners, quenchers and antioxidants can be added to the composition, the percentages being based on the total weight of the binder and crosslinking components solids. Typical ultraviolet light screeners and stabilizers include for example, benzophenones, such as hydroxyl dodecycloxy benzophenone, 2,4-dihydroxyl benzophenone, and hydroxyl benzophenones containing sulfonic acid groups; benzoates, such as dibenzoate of diphenylol propane and tertiary butyl benzoate of diphenylol propane; triazines, such as 3,5-dialkyl-4-hydroxyphenyl derivatives of triazine and sulfur containing derivatives of dialkyl-4-hydroxyl phenyl triazine, hydroxyl phenyl-1,3,5-triazine; triazoles, such as 2-phenyl-4-(2,2'-dihydroxyl benzoyl)-triazole and substituted benzotriazoles, such as hydroxy-phenyltriazole; hindered amines, such as bis(1,2,2,6,6entamethyl-4-piperidinyl sebacate) and di[4(2, 2,6,6,tetramethyl piperidinyl)]sebacate; and any mixtures of any of the above.

In general, the first-pack of the two-pack coating composition contains the crosslinkable component and the second-pack contains the crosslinking component. The two components are mixed just prior to use or about 5 to 30 minutes before use to form a pot mix. A layer of the pot mix is typically applied to a substrate by conventional techniques, such as spraying, electrostatic spraying, roller coating, dipping or brushing. Generally, a layer having a thickness in the range of from 25 micrometers to 75 micrometers is applied over a metal substrate, such as automotive body.

Generally, within about 90 minutes to about 2 hours after application, the layer from the pot mix of the coating composition cures sufficiently to allow for buffing and polishing, if needed, to remove imperfections and improve the surface of the finish. The composition continues to cure and after several days, it reaches a level of hardness and toughness required for a durable and weatherable automotive finish.

Coating compositions of the present invention are suitable for providing coatings on a variety of substrates, such as metal, wood and concrete substrates and resinous surfaces, such as, for example, RIM (reaction injection molded) auto bumpers and dashboards. The present composition is suitable for providing clear or pigmented coatings (i.e. primer compositions or basecoat compositions) in automotive OEM (original equipment manufacturer) applications and especially suitable for refinish applications typically used in making repairs and touch-ups to automotive bodies. The coating compositions of the present invention are also well suited for use in other applications, such as coating truck bodies, boats, airplanes, tractors, cranes and other metal bodies. The coating compositions of the present invention are also suitable for use in industrial and maintenance coating applications.

EXAMPLES

OCTA-SOLIGEN® ZINC 8, zinc octoate is available from the Lanxess Corporation, Pittsburgh, Pa.

FASCAT® 4202, dibutyltin dilaurate is available from Arkema, Inc., Philadelphia, Pa.

FASCAT® 4200, dibutyltin diacetate is available from Arkema, Inc., Philadelphia, Pa.

12301S activator is CHROMA PREMIER® 12301S activator, available from DuPont, Wilmington, Del.

12305S activator is CHROMA PREMIER® 12305S activator, available from DuPont, Wilmington, Del.

12375S reducer is CHROMA PREMIER® 12375s reducer, available from DuPont, Wilmington, Del.

TI-PURE® 902 is available from DuPont Titanium Technologies, Wilmington, Del.

BYK® 320, wetting aid, BYK® 405, rheology control agent and ANTI TERRA-U®, dispersant are all available from BYK Chemie, BENTONE® 38 rheology control agent is available from Elementis, London, United Kingdom.

MONARCH® 120, black pigment is available from the Cabot Corporation, Boston, Mass.

MISTRON MONOMIX® talc is available from Luzenac, Inc., Oakville, Ontario.

Aluminum Silicate No. 40 is available from Burgess Pigment Company, Sandersville, Ga.

ZP-10® Zinc Phosphate is available from Heucotech Ltd, Fairless Hills, Pa.

AEROSIL® R-972 is available from Degussa Inc., Parsippany, N.J.

Barium Sulfate EWO is available from Sachtleben Chemie, Gmbh, Duisberg, Germany.

The acronym tbaema as used herein is tert-butylaminoethyl methacrylate.

Unless otherwise noted, all ingredients are available from the Aldrich Chemical Company, Milwaukee, Wis.

The following test procedures were used;

Gardner-Holdt viscosity was determined according to ASTM D1545.

The Zahn viscosity of the pot mix (mixture of all of the components of the coating composition) of the coating compositions was measured by using the appropriate Zahn cup supplied by VWR Scientific Products Corporation. The viscosity was measured as soon as the pot mix was prepared and at the designated intervals thereafter. The reading was recorded as number of seconds it took for the pot mix to drain from the Zahn cup [ASTM D1084 (Method D)].

Persoz Hardness Test—The change in film hardness of the coating was measured with respect to time by using a Persoz hardness tester Model No. 5854 (ASTM D4366), supplied by Byk-Mallinckrodt, Wallingford, Conn. The number of oscillations (referred to as Persoz number) was recorded.

Fischer Hardness was determined using a FISCHER-SCOPE® hardness tester, available from the Fischer Technology, Inc., Windsor, Conn.

Sanding was evaluated by a sanding expert. One hour after application of the coating composition, the coating was sanded with a dual action sander fitted with 400 grit sandpaper to sand through the applied layer(s). The operator evaluates the loading on the sandpaper and rates the loading accordingly.

TABLE 1

| Ingredient | Acrylic Polymer #1 | Acrylic Polymer #2 | Acrylic Polymer #3 | Acrylic Polymer #4 | Acrylic Polymer #5 | Acrylic Polymer #6 | Acrylic Polymer #7 |
|---|---|---|---|---|---|---|---|
| Catalyst Mixture | | | | | | | |
| VAZO ® 67[1] | 1.00 | 0.67 | 0.67 | 0.67 | 0.67 | 0.67 | 0.67 |
| n-butyl acetate | 15.25 | 15.3 | 15.3 | 15.3 | 15.3 | 15.3 | 15.3 |
| Ethyl acetate | 2.69 | 2.7 | 2.7 | 2.7 | 2.7 | 2.7 | 2.7 |
| Portion #1 | | | | | | | |
| Styrene | 10.72 | 5.84 | 10.62 | 5.7 | 10.89 | 5.98 | 10.75 |
| 2-Ethylhexyl methacrylate | 6.14 | 2.73 | 6.16 | 2.73 | 6.16 | 2.73 | 6.16 |
| Methyl methacrylate | 9.27 | 5.07 | 9.30 | 5.07 | 9.30 | 5.07 | 9.30 |
| Isobornyl methacrylate | 13.85 | 8.19 | 13.90 | 8.19 | 13.90 | 8.19 | 13.90 |
| 4-Hydroxybutyl acrylate | 7.72 | 5.46 | 7.74 | 5.46 | 7.74 | 5.46 | 7.74 |
| 2-Hydroxypropyl methacrylate | 2.28 | 0 | 2.29 | 0 | 2.29 | 0 | 2.29 |
| n-butyl acetate | 2.39 | 1.2 | 2.40 | 1.2 | 2.4 | 1.20 | 2.40 |
| Portion #2 | | | | | | | |
| Styrene | 0 | 4.91 | 0 | 4.19 | 0 | 4.91 | 0 |
| 2-Ethylhexyl methacrylate | 0 | 3.43 | 0 | 3.43 | 0 | 3.43 | 0 |
| Methyl methacrylate | 0 | 4.23 | 0 | 4.23 | 0 | 4.23 | 0 |
| Isobornyl methacrylate | 0 | 5.71 | 0 | 5.71 | 0 | 5.71 | 0 |
| 4-Hydroxybutyl acrylate | 0 | 2.29 | 0 | 2.29 | 0 | 2.29 | 0 |
| 2-Hydroxypropyl methacrylate | 0 | 2.29 | 0 | 2.29 | 0 | 2.29 | 0 |
| n-butyl acetate | 0 | 1.2 | 0 | 1.20 | 0 | 1.20 | 0 |
| Amine portion | | | | | | | |
| tbaema[1] | 0.14 | 0.14 | 0.27 | 0.27 | 0 | 0 | 0.14 |
| n-butyl acetate | 0.12 | 0.12 | 0.12 | 0.12 | 0 | 0 | 0.12 |
| percent tbaema | 0.27 | 0.27 | 0.54 | 0.54 | 0 | 0 | 0.27 |
| Analytical data | | | | | | | |
| Mn | 6,875 | 10,009 | 9,145 | 9,534 | 10,094 | 10,186 | 8,308 |
| Mw | 16,979 | 24,108 | 23,255 | 22,389 | 23,257 | 24,695 | 22,221 |
| Solids percentage | 49.6 | 49.1 | 49.0 | 48.7 | 48.9 | 49.1 | 49.6 |
| Gardner-Holdt viscosity | L + ½ | O | O | O | O | P | N |

[1]VAZO ® 67 is available from DuPont, Wilmington, Delaware.
2. tbaema is tert-butylaminoethyl methacrylate.

Preparation of Acrylic Polymer 1

To a glass reactor equipped with an agitator, condenser, two separate inlet tubes for initiator and monomer feeds, and under nitrogen atmosphere, and heated with a heating mantle, was added 26.31 parts of n-butyl acetate. The solvent was heated to reflux and the ingredients of Table 1, portion 1 were added over a period of 240 minutes. Simultaneously, a mixture of the catalyst mixture of Table 1 was added over 330 minutes. After the ingredients of Table 1, portion 1 were added, a mixture of the amine portion of table 1 was added all at once to the reaction mixture. After the completion of the initiator feed the reaction mixture was allowed to stir for 60 additional minutes at reflux. After the completion of the hold period, 2.13 parts of n-butyl acetate were added. The reaction was cooled to room temperature.

Preparation of Acrylic Polymers 2, 4 (Comparative) and 6 (Comparative)

To a glass reactor equipped with an agitator, condenser, two separate inlet tubes for initiator and monomer feeds, and under nitrogen atmosphere, and heated with a heating mantle was added 26.4 parts of n-butyl acetate. The solvent was heated to reflux and the ingredients of Table 1, portion 1 were added over a period of 240 minutes. Simultaneously, a mixture of the catalyst mixture of Table 1 was added over 330 minutes. The ingredients of Table 1 portion 2 were added immediately after the completion of portion 1 over a period of 120 minutes. When the addition of portion 2 of Table 1 was complete, the amine portion of Table 1 was then added all at once to acrylic polymers 2 and 4. When the addition of the initiator mixture was complete, the reaction mixture was stirred for 60 minutes, 2.14 parts of n-butyl acetate were added, and the mixture was cooled to room temperature.

Preparation of Comparative Acrylic Polymers 3 (Comparative), 5 (Comparative) and 7

To a glass reactor equipped with an agitator, condenser, two separate inlet tubes for initiator and monomer feeds, and under nitrogen atmosphere, and heated with a heating mantle, 26.4 parts of n-butyl acetate. The solvent was heated to reflux and the ingredients of Table 1, portion 1 were added over a period of 240 minutes. Simultaneously, a mixture of the catalyst mixture of Table 1 was added over 330 minutes. When the addition of portion 1 of Table 1 was complete, the amine portion of Table 1 was then added all at once to acrylic polymers 3 and 7. After the completion of the catalyst mixture, the reaction was allowed to stir for 60 additional minutes at reflux. After the completion of the hold period, 2.14 parts of n-butyl acetate were added. The reaction was cooled to room temperature.

Preparation of Primer Mill Bases 1-7

All ingredients listed in Table 2 are in grams. In a one-half gallon can equipped with a lid and a DBI stirrer, the ingredients of Table 2, portion #1 were added, in order, with stirring. After all of the ingredients of portion #1 were added, the mixture was stirred for 15 minutes. The ingredients of portion #2 were added, in order, with stirring. After stirring, the mill base was passed 4 times through a top feed sand mill using 1.5 mm glass beads.

TABLE 2

| Ingredient | Mill Base #1 | Mill Base #2 | Mill Base #3 | Mill Base #4 | Mill Base #5 | Mill Base #6 | Mill Base #7 |
|---|---|---|---|---|---|---|---|
| Portion #1 | | | | | | | |
| Butyl Acetate | 80 | 120 | 120 | 120 | 120 | 120 | 80 |
| Xylene | 58 | 87 | 87 | 87 | 87 | 87 | 58 |
| Methyl Amyl ketone | 198 | 297 | 297 | 297 | 297 | 297 | 198 |
| Acrylic Polymer #1 | 960 | 0 | 0 | 0 | 0 | 0 | 0 |
| Acrylic Polymer #2 | 0 | 1454 | 0 | 0 | 0 | 0 | 0 |
| Acrylic Polymer #3 | 0 | 0 | 1454 | 0 | 0 | 0 | 0 |
| Acrylic Polymer #4 | 0 | 0 | 0 | 1454 | 0 | 0 | 0 |
| Acrylic Polymer #5 | 0 | 0 | 0 | 0 | 1454 | 0 | 0 |
| Acrylic Polymer #6 | 0 | 0 | 0 | 0 | 0 | 1454 | 0 |
| Acrylic Polymer #7 | 0 | 0 | 0 | 0 | 0 | 0 | 960 |
| Nitrocellulose solution[1] | 114 | 171 | 171 | 171 | 171 | 171 | 114 |
| BYK ® 320 | 24 | 36 | 36 | 36 | 36 | 36 | 24 |
| ANTI-TERRA ® U | 23 | 34.5 | 34.5 | 34.5 | 34.5 | 34.5 | 23 |
| BENTONE ® 38 | 178 | 267 | 267 | 267 | 267 | 267 | 178 |
| MONARCH ® 120 | 26 | 39 | 39 | 39 | 39 | 39 | 26 |
| BYK ® 405 | 13 | 19.5 | 19.5 | 19.5 | 19.5 | 19.5 | 13 |
| Portion #2 | | | | | | | |
| MISTRON MONOMIX ® | 164 | 246 | 246 | 246 | 246 | 246 | 164 |
| ZP-10 ® | 238 | 357 | 357 | 357 | 357 | 357 | 238 |
| AEROSIL ® R-972 | 58 | 87 | 87 | 87 | 87 | 87 | 58 |
| Aluminum Silicate No. 40 | 492 | 738 | 738 | 738 | 738 | 738 | 492 |
| Ti-Pure 902 | 608 | 912 | 912 | 912 | 912 | 912 | 608 |
| Barium Sulfate EWO | 530 | 795 | 795 | 795 | 795 | 795 | 530 |

[1]Nitrocellulose is available from the Scholle Chemical Corporation, Atlanta, Georgia.

Preparation of Coating Compositions A to G for Use as a Primer

TABLE 3

| Ingredient | Primer A | Primer B | Primer C | Primer D | Primer E | Primer F | Primer G |
|---|---|---|---|---|---|---|---|
| Acrylic Polymer #1 | 21 | 0 | 0 | 0 | 0 | 0 | 0 |
| Acrylic Polymer #2 | 0 | 21 | 0 | 0 | 0 | 0 | 0 |
| Acrylic Polymer #3 | 0 | 0 | 21 | 0 | 0 | 0 | 0 |
| Acrylic Polymer #4 | 0 | 0 | 0 | 21 | 0 | 0 | 0 |
| Acrylic Polymer #5 | 0 | 0 | 0 | 0 | 21 | 0 | 0 |
| Acrylic Polymer #6 | 0 | 0 | 0 | 0 | 0 | 21 | 0 |
| Acrylic Polymer #7 | 0 | 0 | 0 | 0 | 0 | 0 | 21 |
| Mill Base #1 | 312.5 | 0 | 0 | 0 | 0 | 0 | 0 |
| Mill Base #2 | 0 | 312.5 | 0 | 0 | 0 | 0 | 0 |
| Mill Base #3 | 0 | 0 | 312.5 | 0 | 0 | 0 | 0 |
| Mill Base #4 | 0 | 0 | 0 | 312.5 | 0 | 0 | 0 |
| Mill Base #5 | 0 | 0 | 0 | 0 | 312.5 | 0 | 0 |
| Mill Base #6 | 0 | 0 | 0 | 0 | 0 | 312.5 | 0 |
| Mill Base #7 | 0 | 0 | 0 | 0 | 0 | 0 | 312.5 |
| OCTA-SOLIGEN® ZINC 8 | 2.6 | 2.6 | 2.6 | 2.6 | 2.6 | 2.6 | 2.6 |
| FASCAT® 4202 | 0.5 | 0.5 | 0.5 | 0.5 | 0.5 | 0.5 | 0.5 |
| FASCAT® 4200 | 0.2 | 0.2 | 0.2 | 0.2 | 0.2 | 0.2 | 0.2 |
| 12375S | 53 | 53 | 53 | 53 | 53 | 53 | 53 |
| 12301S | 29 | 29 | 29 | 29 | 29 | 29 | 29 |

Preparation of Primer Compositions 1-7

21 grams of the Acrylic polymer of TABLE 3 was stirred with 312.5 grams of the Mill base of TABLE 3 to mix thoroughly. While stirring, 2.6 grams zinc octoate was added to the mixture followed by 0.5 grams of FASCAT® 4202, dibutyl tin dilaurate. 0.2 grams of a 1 % solution of VM-1665 was then added and the mixture was thoroughly stirred. This mixture was diluted with 53 grams of CHROMA PREMIER® 12375s reducer followed by the addition of 29 grams of CHROMA PREMIER® 12301s activator to obtain an initial Zahn #3 close to 13.0 seconds.

The Zahn #3 viscosity of Primer compositions 1-7 were then tested after the initial mixing, at 30 minutes and again at 60 minutes. The results are given in TABLE 4.

TABLE 4

| Primer Composition | Initial Zahn #3 viscosity (seconds) | 30 minute Zahn #3 viscosity (seconds) | 60 minute Zahn #3 viscosity (seconds) |
|---|---|---|---|
| A (0.27% tbaema) | 11.41 | 14.53 | 24.12 |
| B (0.27% tbaema) | 12.15 | 16.41 | 25.91 |
| C (comparative, 54% tbaema) | 11.75 | 14.75 | 22.34 |
| D (comparative, 0.54% tbaema) | 11.78 | 14.53 | 20.53 |
| E (comparative, 0% tbaema) | 12.50 | 21.59 | 48.91 |
| F (comparative, 0% tbaema) | 11.78 | 18.56 | 40.43 |
| G (0.27% tbaema) | 12.49 | 15.97 | 20.43 |

The results show that primer compositions containing 0%, 0.27% and 0.54% have comparable Zahn #3 viscosities. It is somewhat unexpected that primer compositions E and F have the highest 60 minute Zahn #3 viscosities. However, the compositions comprises several types of pigments and other additives which may be interacting with the resin components.

Preparation of Coating Compositions H to N for Use as a Clear Film.

TABLE 5

| Ingredient | Clear film H | Clear Film I | Clear Film J | Clear Film K | Clear Film L | Clear Film M | Clear Film N |
|---|---|---|---|---|---|---|---|
| Acrylic Polymer #2 | 58.2 | 0 | 0 | 0 | 0 | 0 | 58.2 |
| Acrylic Polymer #3 | 0 | 58.6 | 0 | 0 | 0 | 0 | 0 |
| Acrylic Polymer #4 | 0 | 0 | 58.9 | 0 | 0 | 0 | 0 |
| Acrylic Polymer #5 | 0 | 0 | 0 | 58.2 | 0 | 0 | 0 |
| Acrylic Polymer #6 | 0 | 0 | 0 | 0 | 58.8 | 0 | 0 |
| Acrylic Polymer #7 | 0 | 0 | 0 | 0 | 0 | 58.0 | 0 |
| FASCAT 4200® | 0.07 | 0.07 | 0.07 | 0.07 | 0.07 | 0.07 | 0.07 |
| 48% zinc 6 naphthenate in xylene, from Lanxess Corp. | 0.44 | 0.44 | 0.44 | 0.44 | 0.44 | 0.44 | 0.44 |
| Butyl acetate | 24.2 | 24.2 | 24.2 | 24.2 | 24.2 | 24.2 | 24.2 |
| 12305S | 16.9 | 16.9 | 16.9 | 16.9 | 16.9 | 16.9 | 16.9 |

The ingredients for clear films H-N were added, in order, as shown in Table 5 and mixed with a mixing stick. The Zahn #2 viscosity was measured every 15 minutes for the first hour, then every 30 minutes afterward until the samples gelled.

Films were applied to ACT cold roll steel panels (part #APR33374), available from ACT Laboratories, Inc., using a 10-mil drawdown blade. The panels were allowed to dry and cure at room temperature. The Persoz hardness was tested at 2, 3 and 24 hours after preparation and the Fisherscope hardness was tested at 24 hours after preparation. The results are given in Table 6.

TABLE 6

|  | Clear film H (0.27% tbaema) | Clear film I (0.54% tbaema) | Clear film J 0.54% tbaema) | Clear film K (0% tbaema) | Clear film L (0% tbaema) | Clear film M (0.27% tbaema) | Clear film N (0.27% tbaema) |
| --- | --- | --- | --- | --- | --- | --- | --- |
| Zahn #2 (seconds) | | | | | | | |
| Initial | 25.8 | 27.6 | 26.7 | 25.8 | 26.0 | 25.5 | 26.7 |
| 15 mins | 26.6 | 28.2 | 26.7 | 26.7 | 26.7 | 26.7 | 27.1 |
| 30 mins | 28.1 | 30.4 | 28.2 | 27.7 | 27.8 | 27.4 | 28.1 |
| 45 mins | 30.7 | 32.9 | 30.9 | 29.8 | 30.5 | 29.4 | 31.0 |
| 60 mins | 37.7 | 37.4 | 36.4 | 33.0 | 36.5 | 32.3 | 34.7 |
| 90 mins | 78 | 59.5 | 64 | 48.8 | 70 | 45.5 | 57.2 |
| 120 mins | gel | 295 | gel | 139 | gel | 119 | gel |
| 150 mins |  | gel |  | gel |  | gel |  |
| Persoz Hardness | | | | | | | |
| 2 hrs | 41 | 63 | 45 | 29 | 25 | 42 | 70 |
| 3 hrs | 85 | 105 | 85 | 52 | 44 | 73 | 110 |
| 24 hrs | 259 | 263 | 263 | 214 | 191 | 256 | 277 |
| 24 hr Fischer | 60.0 | 77.0 | 76.0 | 77.0 | 61.0 | 88.0 | 78.0 |
| Film Build (mils) | 1.5 | 1.5 | 1.6 | 1.5 | 1.6 | 1.6 | 1.5 |

The results of Table 6 shows that compositions containing 0%, 0.27% and 0.54% amine functional monomer have comparable pot lives. However, the 2- and 3-hour Persoz hardness measurements for compositions containing no amine monomer are much lower that that of compositions containing 0.27% or 0.54% amine monomer. At 24 hours, the Persoz hardness for compositions containing no amine monomer is still about 20% lower than compositions containing 0.27% and 0.54% amine monomer. This experiment shows that the early cure of a composition containing less than 0.5% amine monomer can be achieved.

What is claimed is:

1. A coating composition comprising a crosslinkable component and a crosslinking component wherein said crosslinkable component comprises a polymer that is the reaction product obtained by polymerizing a monomeric composition comprising;
   a) in the range of from 5 to 50 percent by weight, based on the total weight of said polymer, of at least one monomer having a primary hydroxyl group,
   b) in the range of from 2 to 30 percent by weight, based on the total weight of said polymer, of at least one monomer having a secondary hydroxyl group, and
   c) in the range of from 0.1 to less than 0.5 percent by weight, based on the total weight of said polymer, of at least one monomer having a secondary amine group
wherein said polymer has a Tg in the range of from −20 to 100° C., a weight average molecular weight in the range of from 1,000 to 40,000.

2. The coating composition of claim 1 wherein component (a) is an ω-hydroxyalkylacrylate or ω-hydroxyalkylmethacrylate; component (b) is selected from 2-hydroxypropyl acrylate or 2-hydroxypropyl methacrylate; and said component (c) is selected from t-butylamino ethyl acrylate or t-buytlamino ethyl methacrylate.

3. The coating composition of claim 1 wherein component (c) is present in the range of from 0.2 to 0.45 percent by weight, based on the total weight of said polymer.

4. The coating composition of claim 1 used as a primer composition, a basecoat composition or a clearcoat composition.

5. An article comprising a coating of claim 1.

6. A process for preparing a polymer suitable for use in a coating composition comprising the sequential steps of:
   (i) forming a monomer mixture comprising (a) in the range of from 5 to 50percent by weight, based on the total weight of said polymer, of at least one monomer having a primary hydroxyl group and (b) in the range of from 2 to 30 percent by weight, based on the total weight of said polymer, of at least one monomer having a secondary hydroxyl group;
   (ii) allowing said monomer mixture to at least partially polymerize, optionally in the presence of a free radical generating initiator;
   (iii) adding in the range of from 0.1 to 0.5 percent by weight, based on the total weight of said polymer, of at least one monomer (c) having a secondary amine group to the partially polymerized monomer mixture of step (ii), and
   (iv) optionally adding free radical generating initiator to the mixture formed in step (iii)
wherein said polymer has a Tg in the range of from −20 to 100° C., a weight average molecular weight in the range of from 1,000 to 40,000.

7. A coating composition made by the process of claim 6.

8. An article comprising a coating composition of claim 1.

9. A process for coating a substrate comprising the step of: applying a coating composition comprising a crosslinkable component and a crosslinking component wherein said crosslinkable component comprises a polymer that is the reaction product obtained by polymerizing a monomeric composition comprising;
   a) in the range of from 5 to 50 percent by weight, based on the total weight of said polymer, of at least one monomer having a primary hydroxyl group, b) in the range of from 2 to 30 percent by weight, based on the total weight of said polymer, of at least one monomer having a secondary hydroxyl group, and
c) in the range of from 0.1 to less than 0.5 percent by weight, based on the total weight of said polymer, of at least one monomer having a secondary amine group wherein said polymer has a Tg in the range of from −20 to 100° C., a weight average molecular weight in the range of from 1,000 to 40,000.

10. The process of claim 9 wherein component (a) is an ω-hydroxyalkylacrylate or ω-hydroxyalkylmethacrylate; component (b) is selected from 2-hydroxypropyl acrylate or 2-hydroxypropyl methacrylate; and said component (c) is selected from t-butylamino ethyl acrylate or t-buytlamino ethyl methacrylate.

11. The process of claim 9 wherein component (c) is present in the range of from 0.2 to 0.45 percent by weight, based on the total weight of said polymer.

12. An article coated by the process of claim 9.

13. The article of claim 12 wherein the article surface comprises metal, wood, concrete or resinous material.

* * * * *